US006728088B2

(12) United States Patent
Aiello et al.

(10) Patent No.: US 6,728,088 B2
(45) Date of Patent: Apr. 27, 2004

(54) PROTECTION CIRCUIT AGAINST HIGH CURRENTS IN LIGHTING CONVERTERS

(75) Inventors: Natale Aiello, Trecastagni (IT); Atanasio La Barbera, Mascalucia (IT); Vincenzo Randazzo, Biancavilla (IT); Giovanni Luca Torrisi, Catania (IT)

(73) Assignee: STMicroelectronics S.r.l., Agrate Brianza (IT)

(*) Notice: Subject to any disclaimer, the term of this patent is extended or adjusted under 35 U.S.C. 154(b) by 160 days.

(21) Appl. No.: 09/969,552

(22) Filed: Oct. 2, 2001

(65) Prior Publication Data

US 2002/0085331 A1 Jul. 4, 2002

(30) Foreign Application Priority Data

Oct. 2, 2000 (IT) .................................... MI2000A2125

(51) Int. Cl.[7] .................................................. H02H 5/04
(52) U.S. Cl. .......................................... 361/103; 361/54
(58) Field of Search .............................. 361/54, 56, 91, 361/103, 111

(56) References Cited

U.S. PATENT DOCUMENTS

| | | | | | |
|---|---|---|---|---|---|
| 5,543,996 | A | * | 8/1996 | Nakago | 361/90 |
| 5,638,246 | A | * | 6/1997 | Sakamoto et al. | 361/103 |
| 6,051,933 | A | * | 4/2000 | Aiello et al. | 315/209 R |
| 6,055,149 | A | * | 4/2000 | Gillberg et al. | 361/103 |
| 6,128,172 | A | * | 10/2000 | Feldtkeller | 361/93.8 |
| 6,144,246 | A | * | 11/2000 | Wachter | 327/513 |
| 2002/0021539 | A1 | * | 2/2002 | Odaohhara et al. | 361/103 |

* cited by examiner

*Primary Examiner*—Jonathan Salata
(74) *Attorney, Agent, or Firm*—Allen, Dyer, Doppelt Milbrath & Gilchrist, P.A.; Lisa K. Jorgenson

(57) ABSTRACT

An electronic thermal protection circuit is for high currents which can occur in the start-up phase in lighting converters. The circuit is associated with a power device having an output terminal connected to an electric load and at least one control terminal receiving a predetermined driving current value by a driving circuit portion. Advantageously, an integrated temperature sensor is provided to detect the temperature of the power device, and an output stage is connected downstream of the sensor to switch off the driving circuit portion when a predetermined operation temperature is exceeded.

8 Claims, 4 Drawing Sheets

PROTECTION CIRCUIT AGAINST HIGH CURRENTS IN LIGHTING CONVERTERS

FIELD OF THE INVENTION

The present invention relates to electronic circuits, such as to protection circuits against high currents in lighting converters. More particularly, but not exclusively, the invention relates to a protection circuit associated with a power device having an output terminal connected to an electric load and at least one control terminal receiving a predetermined driving current by a driving circuit.

BACKGROUND OF THE INVENTION

In the following description reference will be made to an electric load represented by a halogen lamp or fluorescent lamp without being limiting thereto. In almost all the applications where lighting converter circuits are used, there are protection circuits that intervene when high currents flow in the converter for a time period longer than the time expected for the circuit start-up. The protection circuits are typically required to prevent some components from being destroyed or damaged.

The attached FIG. 1 schematically shows the structure of an AC/AC converter used for driving a halogen lamp as in the prior art. The structure of FIG. 1 is substantially an electronic transformer provided with a protection against short circuit on the load, since in the start-up phase the load current is much higher than the nominal current.

Differently from what happens with fluorescent lamps, the circuit 1 of FIG. 1 is powered by an external AC voltage source network, rectified at double half-wave. A diac 2 enables the converter circuit during each supply cycle. The circuit 1 comprises a power device 3 in each portion of a half-bridge structure including a pair of driving elements. More particularly, a high side driver component 4 and a low side driver component 5 are connected in series between a high supply voltage reference and ground GND.

The interconnection node X between the components 4 and 5 is connected to a halogen lamp 6. A first winding 7 is provided between the node X and the high side component 4, while a second winding 8 is provided between the node X and the second low side component 5.

The current Iload flowing in the lamp 6 is alternately switched, preferably at a frequency of 30 to 50 KHz, by the half-bridge branches. The high supply voltage is derived from the alternating current (AC) external supply through the diac 2. Several RC circuits are provided between the high supply voltage and the ground to obtain voltage values to be applied to the low side component 5 or to the high side component 4.

For these applications a circuit 9 shown in FIG. 2 is typically used, which serves to implement a gradual start-up, called a "soft start-up". The circuit 9 has a first terminal connected to the voltage supply Valim, produced inside circuit 1, and a second terminal connected to the node X. This circuit 9 comprises a power bipolar transistor Q1 having conduction terminals, that is, collector and emitter terminals, coupled to the second terminal and to ground respectively. A sensing resistor Rsense is provided between the emitter and ground for measuring the current Ie flowing through the conduction terminals.

The base terminal B1 of the transistor Q1 is coupled to the first supply terminal by a diac D and a resistance R3. A second bipolar transistor Q2 has its conduction terminals, that is, its collector and emitter terminals, connected respectively to the transistor base B1 by the diac D and to ground. A capacitor Cd is connected in parallel between the driving terminal and conduction terminal of the transistor Q2.

A resistance R2 is provided between the base B2 of the second transistor Q2 and ground. An electrolytic capacitance C1 is included in a first circuit portion comprising the resistance R2 and an additional resistance R1 having a terminal is connected to the base B2. The capacitance C1 is also inserted in a second circuit portion comprising the resistor Rsense and a diode D1.

The electrolytic capacitance C1 is charged when the voltage drop Rsense*Ie is higher than the voltage sum Vbed1+VC1 and drives the transistor Q1. The time constant generated by the capacitance C1 and the resistance R1 has a high value and ensures that the transistor Q1 is kept in the on state for several half waves of the supply voltage waveform Valim.

The transistor Q1 performs the function of draining part of the current which would flow, though the resistance R3, on the capacitor Cd. This slows the corresponding charge and delays the start of the diac 2. This causes a shift of the instant in which, in the half wave of the supply voltage, the circuit 9 starts oscillating. Because of the gradual impedance variation inside the lamp, the currents become lower and lower and the transistor Q1 will have less base current available if the capacitance C1 is charged at a lower value.

Consequently, the diac 2 will be delayed by a lower time than the previous half wave. Therefore, the circuit 9 will keep on operating, but with a decreasing impact, until the current switched in the lower branch reaches the steady state value.

The circuit is disabled until the transistor Q1 has the required base current to be switched on. Therefore high time constants are needed so that, if a short circuit occurs, the circuit in the off state sustains several cycles of the supply voltage Valim, and this is so even for a few seconds.

Once the capacitance C1 charge is exhausted and the transistor Q1 is shut-off, the cycle starts oscillating with the highest current, just near the short circuit current, until the capacitance C1 reaches once again a useful signal for driving the transistor Q1. The capacitance C1 charge is strictly linked to the current value on the resistor Rsense. The circuit 10 is substantially a peak detector.

The half-bridge converters used to drive fluorescent lamps, for which the fluorescent tube replacement is provided, are provided with a ballast protection which intervenes when the tube is exhausted (EOL - End of Life condition). With reference to FIG. 3, this EOL tube state is represented schematically with an LC circuit having a low impedance and allowing the driving circuit to oscillate freely with high currents. In a normal start-up phase this condition is present until the tube is triggered. In this phase, the triggered tube is located in parallel with the capacitance C1, and the circuit 9, once the load impedance is changed, oscillates with low currents. In EOL conditions, through the conduction path formed by the components C2-R11-R21-D11 shown in FIG. 3, the electrolytic capacitor C3 is charged. This capacitor C3 potential enables the latch circuit 11 to be triggered, determining the low side component 5 switch-off and, thus ending the oscillation. The C3 charge time constant allows the EOL condition to be discriminated from the normal start-up condition.

SUMMARY OF THE INVENTION

In view of the foregoing background, it is therefore an object of the present invention to provide a circuit for protecting against high currents in lighting converters, and wherein the circuit has relatively simple structural and functional characteristics and allows adequate protection, particularly in the start-up phase, against power dissipation caused by high current oscillations.

The present invention detects the excessive increase of the power device temperature, due to the power dissipation in connection with high current oscillations, by using a thermal sensor integrated in the driving circuit. The sensor output is used in a thermal protection block which intervenes, according to the topology being used, to set the potential of appropriate and predetermined circuit nodes.

One embodiment of the invention is directed to an electronic protection circuit against high currents in lighting converters including at least one switching power device having an output terminal connected to an electric load and at least one control terminal receiving a predetermined driving current value by a driving circuit portion. The circuit also preferably includes an integrated temperature sensor detecting the temperature of the power device, and an output stage connected downstream of the sensor to switch off the driving circuit portion when a predetermined operation temperature is exceeded.

BRIEF DESCRIPTION OF DRAWINGS

The features and advantages of the circuit according to the invention will become apparent from the following description of an embodiment thereof given by way of a non-limiting example with reference to the accompanying drawings in which.

DETAILED DESCRIPTION OF THE PREFERRED EMBODIMENTS

Figure 1:
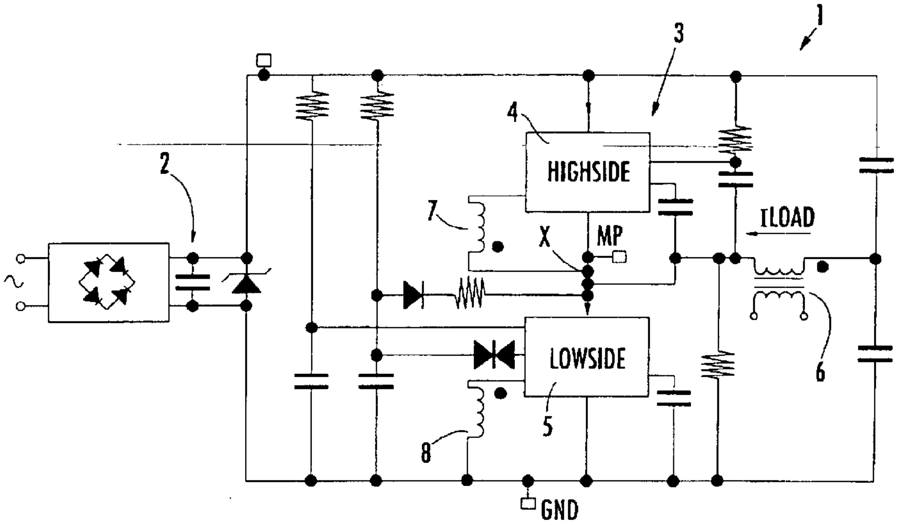
FIG. 1. (PRIOR ART)
FIG. 1 is a schematic view of an AC/AC converter circuit and attached driving portion of an electric load in accordance with the prior art.
Figure 2:
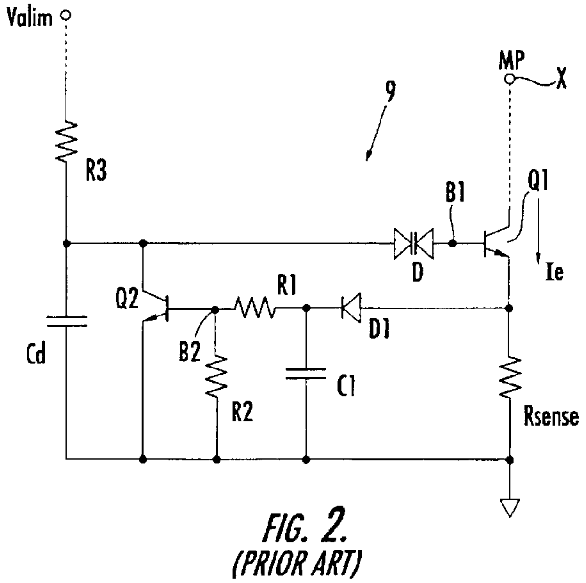
FIG. 2. (PRIOR ART)
FIG. 2 is a schematic view of a circuit portion working with the circuit of FIG. 1 according to the prior art.

With reference to the drawings, an electronic circuit according to the invention for protecting against high currents in a driving circuit for an electric load 6, driven through a power device 12, is generally and schematically indicated with reference numeral 10. We will refer hereinafter to a power device 12 corresponding to any electronic component being effective to switch electric loads 11 on and off, by supplying the load with a relatively high current (switch on) or interrupting the current flow (switch off). We will also further refer hereinafter to an electric load 6 corresponding to any electric or electronic component activated by a current flow or by a predetermined voltage value applied to its terminals. Within the scope of the present invention, the electric load can be resistive or inductive, as for example a halogen lamp.

Figure 4:
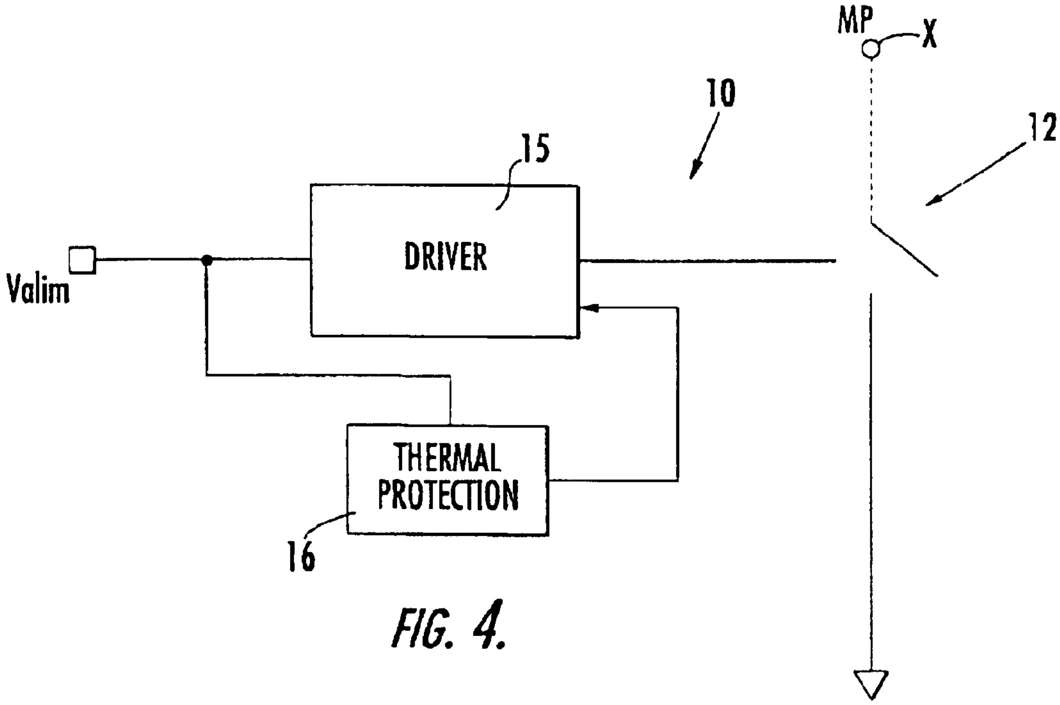
FIG. 4 is a schematic block view of an embodiment of the circuit according to the invention.

With reference to the above-indicated example of FIG. 4, the circuit according to the invention can be represented schematically by a driving circuit 15 powered by the supply reference Valim and having the output connected to a control terminal of the power device 12. A protection block 16, comprising an integrated temperature sensor 17, is, in turn, powered by the supply voltage reference Valim and cooperates with the driving circuit 15 to activate or deactivate it, when necessary, according to the temperature value detected on the power device 12.

The thermal protection block 16 detects the excessive increase of the power device 12 temperature using a thermal sensor 17 integrated inside the circuit. The output of block 16 intervenes on the driving circuit 15 according to the circuit topology being used.

The invention may be used for instance in the electronic converter of FIG. 1 in a preferred embodiment which will be now described with reference to FIG. 5. A first circuit branch coupling the supply voltage Valim to ground includes a MOS transistor M9 and a bipolar transistor T4. The MOS transistor M9 is coupled to another MOS transistor M10 to form a current mirror 13. A voltage divider comprising at least a pair of resistances R1, R2, is provided on the circuit branch including the transistor M10. The interconnection node between the resistances R1, R2 is connected to the base B4 of transistor T4.

The base B4 of the transistor T4 is coupled to ground GND through a series connection between a resistance R3 and a MOS transistor M20. This series connection is in parallel with the resistance R2. An inverter 18, including a complementary pair of MOS transistors M18 and M19, is connected between the transistor T4 collector terminal CT and the control terminal of an output MOS transistor M21 which acts directly on the diac 2 shown in FIG. 1.

The transistor T4 collector terminal CT is also connected to the transistor M20 control terminal. The transistor T4 is normally shut-off at ambient temperature. In such operating conditions, the collector CT thereof reaches the supply voltage Valim potential, i.e., a high logic value.

The MOS transistor M21 is thus in the off state. Moreover, the MOS transistor M20, having a less important conduction resistance Ron than the series-connected resistance R3, is in the on state, thus connecting in parallel the resistance R3 to the resistance R2. Consequently, the potential on the transistor T4 base B4 is compared with the voltage drop Vbe on the base and emitter terminals of the same transistor. If the temperature increases, the two signals converge until crossing at a predetermined temperature value T.

In that instant the start-up phase of the bipolar transistor T4 is enabled, and consequently, also the start-up phase of the output MOS transistor M21, with subsequent switching off of the diac 2 capacity. There is a circuit hysteresis carried out by the transistor M20 which, with the active thermal condition, has a low gate potential. So, the resistance R3 is no longer parallel-connected to the resistance R2, and, therefore, the potential on the transistor T4 base B4 raises, confirming the transistor switching.

Figure 3:
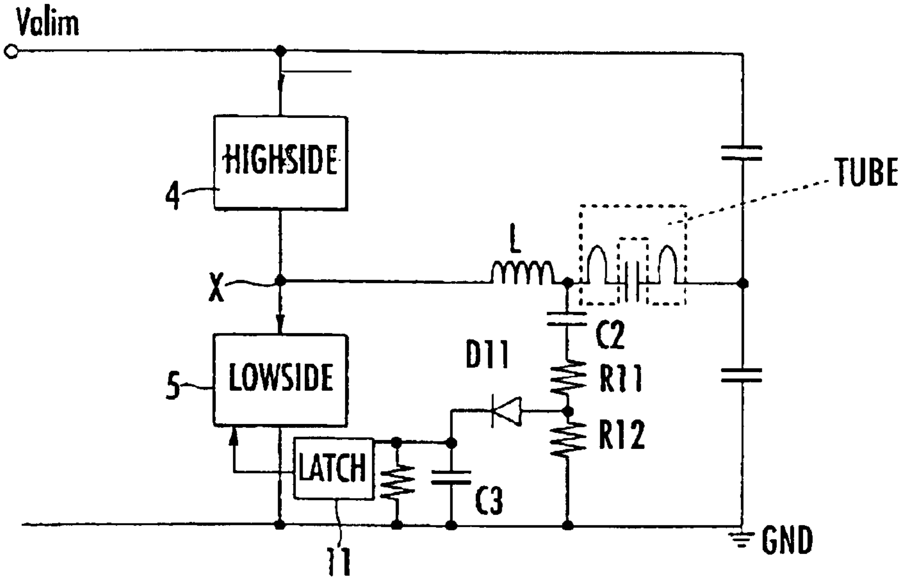
FIG. 3. (PRIOR ART)
FIG. 3 is a schematic view of a prior art circuit for driving a fluorescent lamp according to the prior art.
Figure 6:
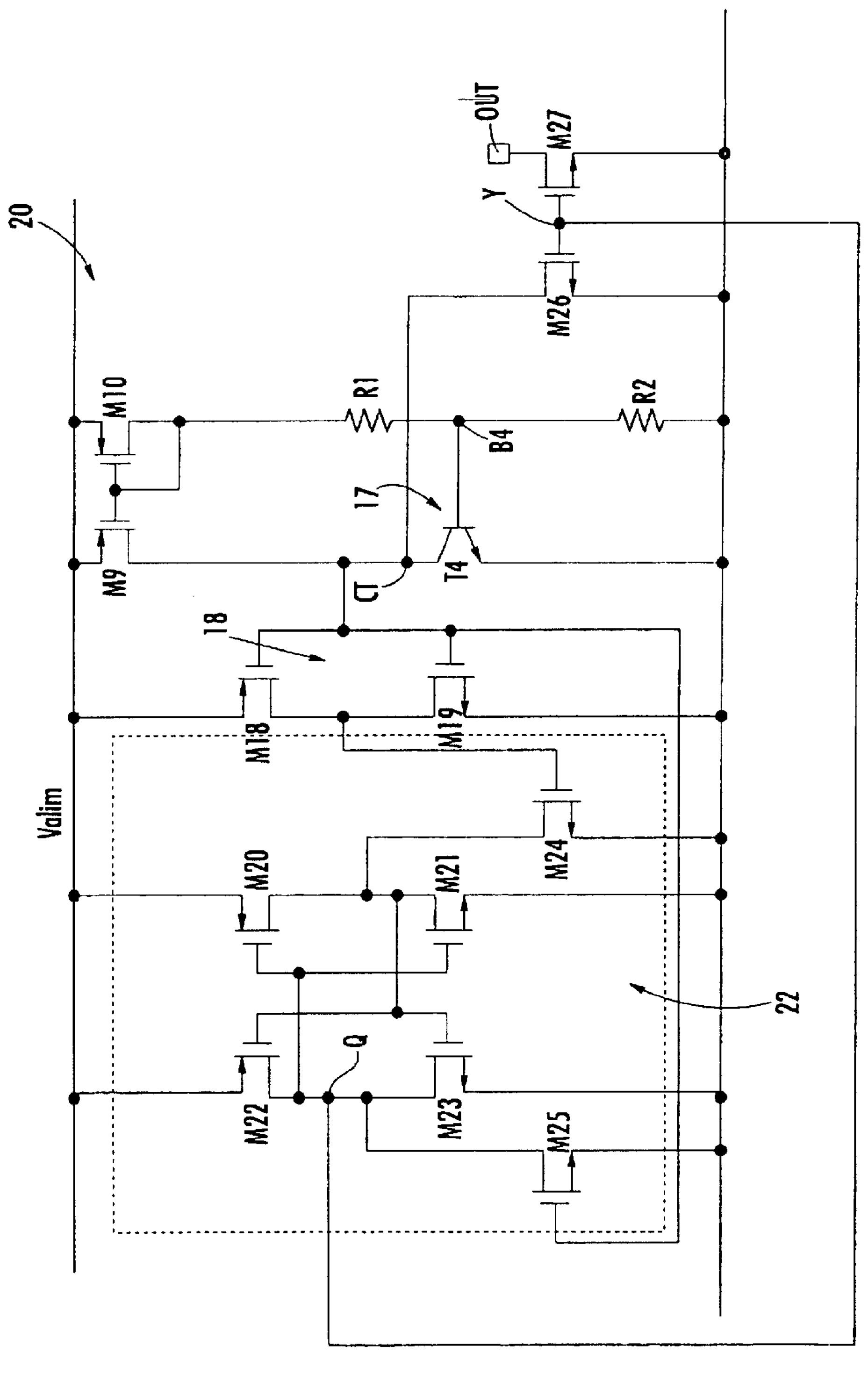

The invention has also been applied to a fluorescent lamp driving circuit, as shown in FIG. 3, equipped with a ballast device. The example of FIG. 6 shows a further embodiment 20 which allows the application of the circuit according to the invention to the driving circuit of FIG. 3.

Figure 5:
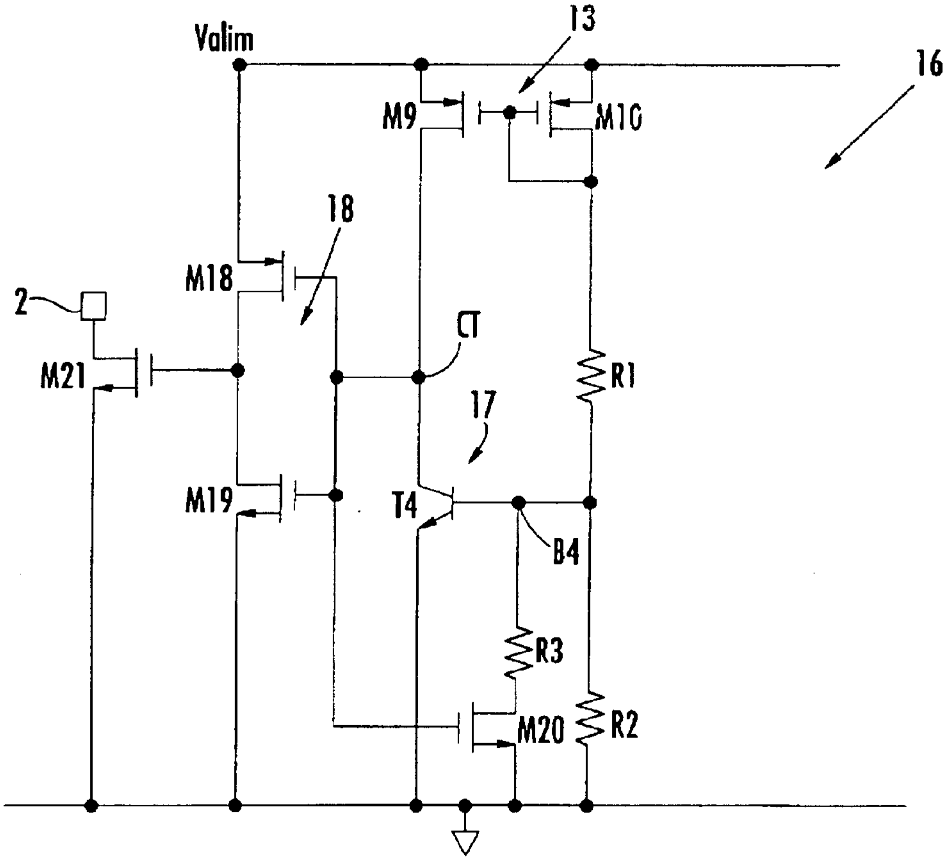
FIGS. 5 and 6 are respective schematic views of some details of the circuit of FIG. 4.

The operation mode of the transistor T4, which serves as temperature sensor, is equal to the previous description made with reference to FIG. 5. The further embodiment of FIG. 6 provides the use of a memory element 22, such as an SR-type flip-flop, comprising an assembly of transistors M20, M21, M22, M23, M24 and M25. The memory element 22 is connected downstream of the inverter 18 and has an output Q connected to an interconnection node Y between the control terminals of a pair of MOS transistors M26 and M27.

The transistor M27 directly drives the low side component 5 connected to the terminal OUT thereof. The transistor M26 has a conduction terminal connected to the bipolar transistor T4 collector CT. The potential of the transistor T4 collector CT, and its inverted value through the inverter 18, represent the SR flip-flop 22 inputs. At low temperature, i.e., with an inactive thermal sensor, the transistor T4 collector CT is high and the output Q is low, Consequently, the transistors M26 and M27 are in the off state. The latter performs the function of switching the low side 5 driver off.

As soon as the temperature increases and the thermal intervention protection is requested, the transistor T4 collector CT reaches a low value, the flip-flop 22 inputs are inverted, and the output Q becomes high and enables the MOS transistors M27 and M26, thus confirming that the switching has occurred. In these conditions, the flip-flop 22 is fixed at the set value since the transistor T4 collector is still low because of the action of the transistor through M26.

To reset the starting conditions, with a low output Q, it is necessary to interrupt the supply to the circuit. Therefore, the circuit according to the invention addresses the shortcomings of the prior art and provides several advantages. Perhaps the most important advantage being that the thermal protection of the load and of the relevant driving circuit is particularly effective and rapid in intervention, since it is integrated in the power device driving circuit. A further advantage is that the circuit according to the invention can be totally integrated, with the corresponding well-known advantages.

From the foregoing it will be appreciated that, although specific embodiments of the invention have been described herein for purposes of illustration, various modifications may be made without deviating from the spirit and scope of the invention. Accordingly, the invention is not limited except as by the appended claims.

That which is claimed is:

1. An electronic protection circuit against high currents in lighting converters including a driving circuit and at least one switching power device having an output terminal connected to an electric load and at least one control terminal connected to the driving circuit, the electronic protection circuit comprising:

a bipolar transistor for sensing a temperature of the at least one switching power device, said bipolar transistor having a control terminal and a conduction terminal;

an output MOS transistor having a control terminal connected to the conduction terminal of said bipolar transistor for switching off the driving circuit when a predetermined temperature is exceeded; and a feedback MOS transistor having a control terminal connected to the conduction terminal of said bipolar transistor, and having a conduction terminal connected to the control terminal of said bipolar transistor.

2. An electronic protection circuit according to claim 1 further comprising an inverter connected between the conduction terminal of said bipolar transistor and the control terminal of said output MOS transistor.

3. An electronic protection circuit for switching a power device connected to an electric load and a driving circuit for the switching power device, the electronic protection circuit comprising:

a bipolar transistor in the driving circuit for sensing a temperature of the power device, said bipolar transistor having a control terminal and a conduction terminal;

an output MOS transistor having a control terminal connected to the conduction terminal of bipolar transistor for switching off a voltage supply to the driving circuit when predetermined temperature is exceeded;

a memory element having an output terminal connected to the control terminal of said output MOS transistor, and an input terminal connected the conduction terminal of said bipolar transistor; and a feedback MOS transistor having a control terminal connected to the conduction terminal of said bipolar transistor, and a conduction terminal connected to the control terminal of said bipolar transistor.

4. An electronic protection circuit according to claim 3 further comprising an inverter connected between the conduction terminal of said bipolar transistor and the input terminal of said memory element.

5. An AC-to-AC converter comprising:

a driving stage and at least one switching power device coupled thereto;

a bipolar transistor for sensing a temperature of the at least one switching power device, said bipolar transistor having a control terminal and a conduction terminal;

an output MOS transistor having a control terminal connected to the conduction terminal of said bipolar transistor for switching off the driving circuit when a predetermined temperature is exceeded; and an inverter connected between the conduction terminal of said bipolar transistor and the control terminal of said output MOS transistor.

6. An AC-to-AC converter according to claim 5 wherein said output stage further comprises a feedback MOS transistor having a control terminal connected to the conduction terminal of said bipolar transistor, and having a conduction terminal; and wherein the control terminal of said bipolar transistor is connected to the conduction terminal of said feedback MOS transistor.

7. An AC-to-AC converter according to claim 5 further comprising an inverter connected between the conduction terminal of said bipolar transistor and the control terminal of said output MOS transistor.

8. A method for protecting against high currents in a switching power device and a driving circuit connected thereto, the method comprising:

integrating a bipolar transistor in the driving circuit for sensing a temperature of the at least one switching power device; and switching off the driving circuit when a sensed temperature exceeds a predetermined temperature, the switching off comprising using an output MOS transistor connected to the bipolar transistor, and an inverter connected between the bipolar transistor and the output MOS transistor.

* * * * *